United States Patent
Oyman et al.

(10) Patent No.: US 10,433,239 B2
(45) Date of Patent: Oct. 1, 2019

(54) CROSS-LAYER OPTIMIZED ADAPTIVE HTTP STREAMING

(75) Inventors: Ozgur Oyman, San Jose, CA (US); Jeffrey R. Foerster, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 165 days.

(21) Appl. No.: 13/995,162

(22) PCT Filed: Sep. 30, 2011

(86) PCT No.: PCT/US2011/054272
§ 371 (c)(1),
(2), (4) Date: Jun. 17, 2013

(87) PCT Pub. No.: WO2012/134530
PCT Pub. Date: Oct. 4, 2012

(65) Prior Publication Data
US 2013/0290493 A1  Oct. 31, 2013

Related U.S. Application Data

(60) Provisional application No. 61/471,042, filed on Apr. 1, 2011.

(51) Int. Cl.
*H04W 48/10* (2009.01)
*H04L 29/06* (2006.01)
(Continued)

(52) U.S. Cl.
CPC .......... *H04W 48/10* (2013.01); *H04B 7/0456* (2013.01); *H04B 7/0486* (2013.01);
(Continued)

(58) Field of Classification Search
CPC ..... H04W 48/10; H04W 24/02; H04W 16/18; H04W 76/27; H04W 28/24; H04L 65/80;
(Continued)

(56) References Cited

U.S. PATENT DOCUMENTS 7,209,458 B2   4/2007  Ahvonen et al.
8,605,655 B1 * 12/2013  Sahai ................... H04M 15/66
                                                    370/328
(Continued)

FOREIGN PATENT DOCUMENTS

CN    1695391 A    11/2005
CN    101247325 A    8/2008
(Continued)

OTHER PUBLICATIONS

U.S. Appl. No. 61/441,818.*
(Continued)

*Primary Examiner* — Austin J Moreau
(74) *Attorney, Agent, or Firm* — Spectrum IP Law Group LLC

(57) ABSTRACT

Briefly, in accordance with one or more embodiments, an application function module interacts with an application on a remote device that utilizes dynamic policy and charging control to receive an adaptive multimedia stream. A policy and charging rules function (PCRF) module implements policy and charging control decisions, and a policy and charging enforcement function (PCEF) module enforces policy decisions received from the PCRF. The remote device provides session information including a media presentation description to the application function module to provide the multimedia stream to the remote device at a specified quality of service.

26 Claims, 8 Drawing Sheets

(51) Int. Cl.

| | |
|---|---|
| H04W 24/02 | (2009.01) |
| H04B 7/0456 | (2017.01) |
| H04B 7/06 | (2006.01) |
| H04L 5/00 | (2006.01) |
| H04L 25/02 | (2006.01) |
| H04L 25/03 | (2006.01) |
| H04L 12/26 | (2006.01) |
| H04L 12/721 | (2013.01) |
| H04W 24/00 | (2009.01) |
| H04W 24/10 | (2009.01) |
| H04W 28/08 | (2009.01) |
| H04W 48/12 | (2009.01) |
| H04W 52/02 | (2009.01) |
| H04W 52/14 | (2009.01) |
| H04W 52/18 | (2009.01) |
| H04W 72/04 | (2009.01) |
| H04W 4/70 | (2018.01) |
| H04W 72/00 | (2009.01) |
| H04W 88/02 | (2009.01) |
| H04W 88/08 | (2009.01) |
| H04W 92/20 | (2009.01) |
| H04W 28/04 | (2009.01) |

(52) U.S. Cl.
CPC ......... *H04B 7/0632* (2013.01); *H04B 7/0639* (2013.01); *H04L 5/003* (2013.01); *H04L 5/0037* (2013.01); *H04L 5/0094* (2013.01); *H04L 25/0206* (2013.01); *H04L 25/0226* (2013.01); *H04L 25/03343* (2013.01); *H04L 43/50* (2013.01); *H04L 45/70* (2013.01); *H04L 65/608* (2013.01); *H04L 65/80* (2013.01); *H04W 4/70* (2018.02); *H04W 24/00* (2013.01); *H04W 24/02* (2013.01); *H04W 24/10* (2013.01); *H04W 28/08* (2013.01); *H04W 48/12* (2013.01); *H04W 52/0216* (2013.01); *H04W 52/146* (2013.01); *H04W 52/18* (2013.01); *H04W 72/042* (2013.01); *H04W 72/0413* (2013.01); *H04W 72/0453* (2013.01); *H04L 5/005* (2013.01); *H04L 25/0328* (2013.01); *H04L 65/1059* (2013.01); *H04L 2025/03426* (2013.01); *H04L 2025/03802* (2013.01); *H04W 28/04* (2013.01); *H04W 72/00* (2013.01); *H04W 88/02* (2013.01); *H04W 88/08* (2013.01); *H04W 92/20* (2013.01); *Y02D 70/1262* (2018.01); *Y02D 70/1264* (2018.01); *Y02D 70/146* (2018.01); *Y02D 70/444* (2018.01)

(58) Field of Classification Search
CPC ... H04L 65/4092; H04L 67/02; H04L 67/322; H04L 43/08; H04L 45/302; H04L 65/608; H04N 21/2402; H04N 21/2408
See application file for complete search history.

(56) References Cited

U.S. PATENT DOCUMENTS

| | | | | |
|---|---|---|---|---|
| 2002/0054578 | A1* | 5/2002 | Zhang | H04L 1/0001 370/328 |
| 2004/0057412 | A1* | 3/2004 | Curcio | H04W 28/18 370/341 |
| 2004/0073928 | A1 | 4/2004 | Alakoski et al. | |
| 2004/0202197 | A1 | 10/2004 | Gao et al. | |
| 2006/0268933 | A1* | 11/2006 | Kellerer | H04L 67/14 370/469 |
| 2008/0181147 | A1* | 7/2008 | Rydnell | H04L 12/4633 370/310 |
| 2010/0043053 | A1 | 2/2010 | Wei et al. | |
| 2010/0150003 | A1* | 6/2010 | Andreasen | H04L 43/08 370/252 |
| 2012/0151009 | A1* | 6/2012 | Bouazizi | H04L 41/5067 709/219 |
| 2012/0209952 | A1* | 8/2012 | Lotfallah | H04L 65/4084 709/217 |
| 2014/0219230 | A1* | 8/2014 | Schierl | H04W 72/08 370/329 |
| 2015/0016532 | A1* | 1/2015 | Chen | H04N 19/597 375/240.16 |
| 2016/0373324 | A1* | 12/2016 | Gholmieh | H04L 65/4076 |

FOREIGN PATENT DOCUMENTS

| | | |
|---|---|---|
| CN | 101345633 A | 1/2009 |
| HK | 1228115 A | 10/2017 |
| WO | 2012/134530 A1 | 10/2012 |

OTHER PUBLICATIONS

Filin, Stanislav A., et al. "Fast and Efficient QoS-Guaranteed Adaptive Transmission Algorithm in the Mobile WiMAX System." IEEE Xplore. N.p., Nov. 6, 2008. Web. Oct. 6, 2016. http://ieeexplore.ieee.org/stamp/stamp.jsp?arnumber=4460904.*

T. Stockhammer, "Dynamic Adaptive Streaming over HTTP: Standards and Design Principles". ACM Multimedia Systems, Feb. 2011, 11 Pages.

C. Muller et al. "A Test-Bed for the Dynamic Adaptive Streaming over HTTP featuring Session Mobility", ACM Multimedia Systems, Feb. 2011, 6 Pages.

Y. Sanchez et al. "iDASH: Improved Dynamic Adaptive Streaming over HTTP using Scalable Video Coding", ACM Multimedia Systems, Feb. 2011, 8 Pages.

C. Concolato et al. "Usages of DASH for Rich Media Services", ACM Multimedia Systems, Feb. 2011, 6 Pages.

International Search Report and Written opinion for PCT Patent Application No. PCT/US2011/054272, dated May 4, 2012, 10 Pages.

International Preliminary Report on Patentability Received for Patent Application No. PCT/US2011/054272, dated Oct. 10, 2013, 7 Pages.

Search Report received for European Application No. 11861966.7 dated Nov. 28, 2014.

Gabin, Frederic, "3GPP Mobile Multimedia Streaming Standards", magazine, Nov. 2010, p. 134-138, IEEE Signal Processing Magazine.

"PCC/QoS Support for DASH Services", Apr. 2011, 3 pages, Intel Corporation, San Diego, CA.

Notification of Grant received for Chinese Patent Application No. 201180070548.8, dated May 6, 2016, 5 pages including 3 pages of English translation.

Office Action received for European Patent Application No. 11861966.7, dated Jan. 2, 2018, 6 pages.

Extended European Search Report received for European Patent Application No. 18172997.1, dated Jul. 18, 2018, 10 pages.

France Telecom, "IMS Based HTTP Adaptive Streaming," Discussion, Aug. 2010, 11 pages, S4-100622, 3GPP, Erlanguen, Germany.

"Policy and Charging Control Signalling Flows and Quality of Service (QoS) Parameter Mapping," Technical Specification, 2010, 132 pages, V10.0.0 Release 10, 3rd Generation Partnership Project, Sophia Antipolis Valbonne, France.

Office Action received for Chinese Patent Application No. 201610576202.X dated Mar. 18, 2019, 28 pages including 17 pages of English translation.

Office Action Received for Chinese Patent Application No. 201180070548.8, dated Jul. 3, 2015, 19 pages including 12 pages of English translation.

(56) References Cited

OTHER PUBLICATIONS

Gabin, et al. "3GPP Mobile Multimedia Streaming Standards", Magazine, Nov. 2010, pp. 134-138, vol. 27, Issue 6, IEEE Signal Processing Magazine, United States.

* cited by examiner

CROSS-LAYER OPTIMIZED ADAPTIVE HTTP STREAMING

CROSS-REFERENCE TO RELATED APPLICATIONS

The present application claims priority to U.S. Provisional Application No. 61/471,042 filed Apr. 1, 2011 (P37663Z). Said Application No. 61/471,042 is incorporated herein by reference in its entirety.

BACKGROUND

Hypertext transfer protocol (HTTP) streaming is spreading widely as a form of multimedia delivery of Internet video. HTTP-based delivery provides reliable and simple deployment due to the already broad adoption of both HTTP and its underlying Transmission Control Protocol/Internet Protocol (TCP/IP) protocols. Moreover, HTTP-based delivery enables effortless streaming services by avoiding network address translation (NAT) and firewall traversal issues. HTTP-based streaming also provides the ability to use standard HTTP servers and caches instead of specialized streaming servers and has better scalability due to minimal state information on the server side.

Adaptive video streaming is an important capability towards ensuring the best possible video experience for the end client user at all times, in terms of key performance goals such as high video quality, low startup delay and interrupt-free playback. Adaptive video streaming involves continuously optimizing video configurations such as bit rate, resolution and frame rate with respect to changing link conditions, device capabilities and content characteristics. Traditionally, adaptive video streaming generally involves using a state-tracking protocol, for example the Real-Time Streaming Protocol (RTSP). Once a client connects to the streaming server, the server keeps track of the client's state until the client disconnects. Typically, frequent communication between the client and the server is involved for purposes such as session provisioning and negotiation of media parameters. Once a session between the client and the server has been established, the server sends the media as a continuous stream of packets over either User Datagram Protocol (UDP) or TCP transport. Example technologies for RTSP-based adaptive streaming include Microsoft Windows Media™, Apple QuickTime™, Adobe Flash™, and Helix™ by Real Networks, among others.

Dynamic adaptive streaming over HTTP (DASH) is a new adaptive streaming technology that operates differently in comparison to RTSP-based adaptive streaming. In particular, it operates by the use of the HTTP protocol, which is stateless. As a client requests some data, the server responds by sending the data and the transaction is terminated. Each HTTP request is handled as a completely standalone one-time transaction. Prior to the utilization of DASH, progressive download methods were available for media delivery from standard HTTP Web servers. In HTTP-based progressive download, clients that support the approach can seek to selected positions in the media file by performing byte range requests to the Web server. However, HTTP-based progressive download is not really an adaptive streaming technique, i.e., it does not allow dynamically adapting video configurations with respect to changing link conditions, device capabilities or content characteristics. Moreover, disadvantages of HTTP-based progressive download are mostly that bandwidth may be wasted if the user decides to stop watching the content after progressive download has started. In addition, HTTP-based progressive download does not support live media services. DASH technology addresses such weaknesses of HTTP-based progressive download.

Most of the adaptive streaming solutions offered today are for the traditional RTSP-based streaming. As a relatively new technology, DASH-based adaptive streaming currently has the following key challenges for which the solution space is currently very limited. First, DASH moves the adaptive streaming intelligence from the server to the client, letting the client drive the streaming session and make the decisions on the video adaptation parameters. Thus, developing an intelligent client adaptation framework built specifically for DASH-based streaming services is important since the session state cannot easily be tracked by the network under HTTP-based streaming. Second, due to its differences from traditional RTSP-based streaming services, it is also important to devise methods toward delivery of DASH-based services over different Third Generation Partnership Project (3GPP) radio access network (RAN) and core IP network architectures, with support for quality of service (QoS) and service adaptation. Among others, providing QoS support for DASH services impacts the 3GPP policy and charging control architecture (PCC).

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
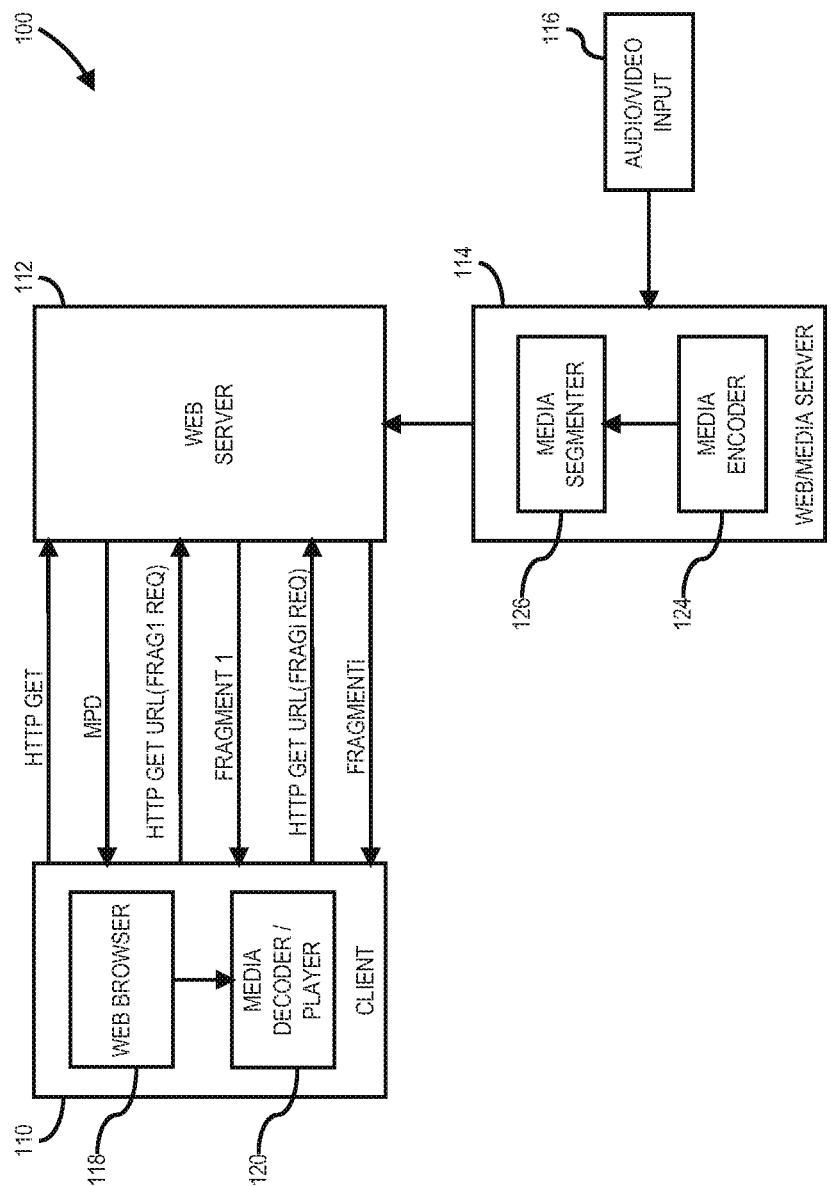
FIG. 1 is a block diagram of procedures at the client and server for Dynamic Adaptive Streaming over HTTP (DASH) in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a block diagram of procedures at the client and server for Dynamic Adaptive Streaming over HTTP (DASH) in accordance with one or more embodiments will be discussed. As shown in FIG. 1, a DASH enabled adaptive streaming network 100 includes a client 110 able to obtain multimedia services from a web server 112 which in turn may serve the multimedia content from a web/media server 114 on which the multimedia content is stored. The web/media server 114 receives the multimedia content via audio/video input 116 which may be a live input stream or previously stored media content, wherein the media is streamed to the client 110. Web/media server 114 may include a media encoder 124 to encode the media content to a suitable format, and media segmenter 126 to split the input media content into a series of fragments or chunks suitable for streaming. Client 110 may include a web browser 118 to interact with web server 112 and a media decoder/player 120 to decode and render the streaming multimedia content. DASH provides the ability to move control of the "streaming session" entirely to the client 110 and therefore moves the adaptive streaming intelligence from the server 112 to the client 110.

In one or more embodiments, the client 110 basically opens one or several or many TCP connections to one or several standard HTTP servers or caches, retrieves a media presentation description (MPD) metadata file providing information on the structure and different versions of the media content stored in the web/media server 114, including for example different bitrates, frame rates, resolutions, codec types, and so on. The MPD is used to convey the HTTP URL of each segment and associated metadata information to map segments into the media presentation timeline. The client 110 requests new data in chunks using HTTP GET or partial HTTP GET messages to obtain smaller data segments (HTTP GET URL(FRAG1 REQ), FRAGMENT 1. HTTP GET URL(FRAGi REQ), FRAGMENT i) of the selected version of media file with individual HTTP GET messages which imitates streaming via short downloads as shown in FIG. 1. The URL of the HTTP GET message is used to tell the web server 112 which segment or segments the client is requesting. As a result, the web browser 118 pulls the media from web server 112 segment by segment (or subsegment by subsegment based on byte range requests). Implementation of DASH on network 100 provides the ability to the client 110 to automatically choose an initial content rate to match initial available bandwidth without requiring the negotiation with the streaming web server 112, and to dynamically switch between different bitrate representations of the media content as the available bandwidth changes. As a result, implementing DASH on network 100 allows faster adaptation to changing network and wireless link conditions, user preferences, content characteristics and device capabilities such as display resolution, processor speed and resources, memory resources, and so on. Such dynamic adaptation provides better user quality of experience (QoE) with shorter startup delays, fewer rebuffering events, better video quality, and so on. Example DASH technologies include Microsoft IIS Smooth Streaming™, Apple HTTP Live Streaming™, and Adobe HTTP Dynamic Streaming™. DASH technology may be implemented by various standards organizations including the Third Generation Partnership Project (3GPP), the Moving Picture Experts Group (MPEG) and the Open Internet Protocol Television (IPTV) Forum (OIPF), among others.

In accordance with one or more embodiments, enabling DASH on network 100 moves the adaptive streaming intelligence from the server 112 to the client 110, letting the client 110 drive the streaming session and make the decisions on the video adaptation parameters. Thus, an intelligent client adaptation framework built specifically for DASH-based streaming services may be implemented in one or more embodiments to track the session state. Such a paradigm shift from push-based, RTSP-based, streaming to pull-based, HTTP-based, streaming is capable of delivering the optimal user quality of experience (QoE). Furthermore, due to its differences from traditional RTSP-based streaming services, delivery of DASH-based services over different 3GPP radio access network (RAN) and core IP network architectures may be implemented, with support for QoS and service adaptation. An example diagram of end-to-end QoS deliver of DASH services is shown in an described with respect to FIG. 2, below.

Figure 2:
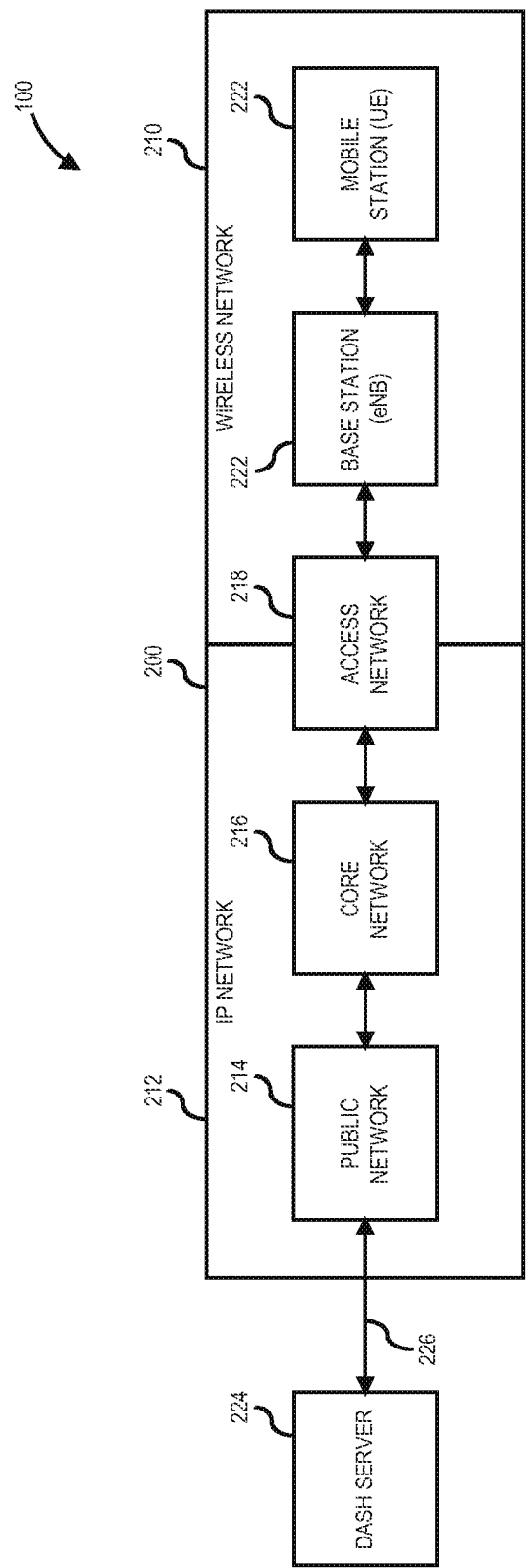
FIG. 2 is a block diagram of and end-to-end quality of service (QoS) architecture for delivery of DASH services in accordance with one or more embodiments.

Referring now to FIG. 2, a block diagram of and end-to-end quality of service (QoS) architecture for delivery of DASH services in accordance with one or more embodiments will be discussed. As shown in FIG. 2, the end-to-end quality of service (QoS) architecture 200 may be utilized to implement the delivery of DASH services on network 100. In the example shown in FIG. 2, network 100 may be a Third Generation Partnership Project (3GPP) network or the like. In one or more alternative embodiments, network 100 may implement an evolution of the 3GPP standard such as a 3GPP Long Term Evolution (LTE) standard, an LTE Advanced standard, a Fourth Generation (4G) standard, and so on. Alternatively, network 100 may implement an Institute of Electrical Engineers (IEEE) 802.16 standard such as an IEEE 802.16e or IEEE 802.16m standard to implement a Worldwide Interoperability for Microwave Access (WiMAX) network or a WiMAX-II network, although the scope of the claimed subject matter is not limited in this respect.

As shown in FIG. 2, end-to-end QoS architecture 200 comprises a wireless network 210 and an internet protocol (IP) network 212. The subcomponents of the wireless network 210 and the IP network 212 include a public network 214 which may be the Internet, core network 216, 215 access network 218, base station 220 which may be an enhanced NodeB (eNB), and a mobile station 222, which may be user equipment (UE). In accordance with one or more embodiments, a DASH server 224 (web server 112) is capable of providing streaming multimedia content 226 to mobile station 222 (client 110) via the IP network 212 and wireless network 210 as discussed in further detail herein.

As part of the internet protocol (IP) network architecture for DASH services, end-to-end QoS architecture 200 involves consideration of three interfaces: the air interface of base station 220, access network 218, and core network 216. Regarding the air interface, such as a WiMAX or LTE network, each interface defines a set of QoS classes or bearers, for example Unsolicited Grant Service, Real-time polling service (rtPS), extend rtPS (ertPS), non-real-time polling service (nrtPS), and best effort (BE) for an IEEE 802.16e standard, and specifies associated service attributes in terms of various performance requirements such as throughput, latency/jitter, packet error-loss rate, and so on. The QoS classes and/or bearers enable the differentiation of the service flows between client applications and various services. In particular, each service flow is mapped to a specific QoS class and receives a common QoS treatment, and service flows are prioritized accordingly, when resources are distributed between different service flows through scheduling functions.

In one or more embodiments, some examples for QoS definitions in IP-based access and core networks include Differentiated Services such as DiffServ (RFC2474) and Integrated Services such as IntServ (RFC1633), specified by the Internet Engineering Task Force (IETF). IntServ follows the flow-based and signaled QoS model, wherein the end-hosts signal their QoS needs to the network 100, while DiffServ works on the provisioned-QoS model, wherein network elements are set up to service multiple classes of traffic with varying QoS requirements. In particular, Diff-Serv uses the 6-bit Differentiated Services Code Point (DSCP) field in the header of IP packets for packet classification purposes. The IntSern model involves the Resource Reservation Protocol (RSVP) to explicitly signal and reserve the desired QoS for each flow in the network 100 as described by the FlowSpecs. In order to provide multi-layer QoS control and manage end-to-end QoS, a convergence sub-layer may be defined to interface higher-layer protocol data units and perform classification and mapping functions. For example, in the case of DiffServ, each end-to-end internet protocol (IP) packet entering the system may be identified with a dedicated air interface bearer for the radio access network, by mapping its DSCP field over the core network from DiffServ to a particular QoS class for the radio access network. However, it should be noted that these are merely example QoS definitions that may be implemented by end-to-end quality of service (QoS) architecture 200, and the scope of the claimed subject matter is not limited in these respects. An example policy and charging control (PCC) architecture for the delivery of DASH services is shown in and described with respect to FIG. 3, below.

Figure 3:
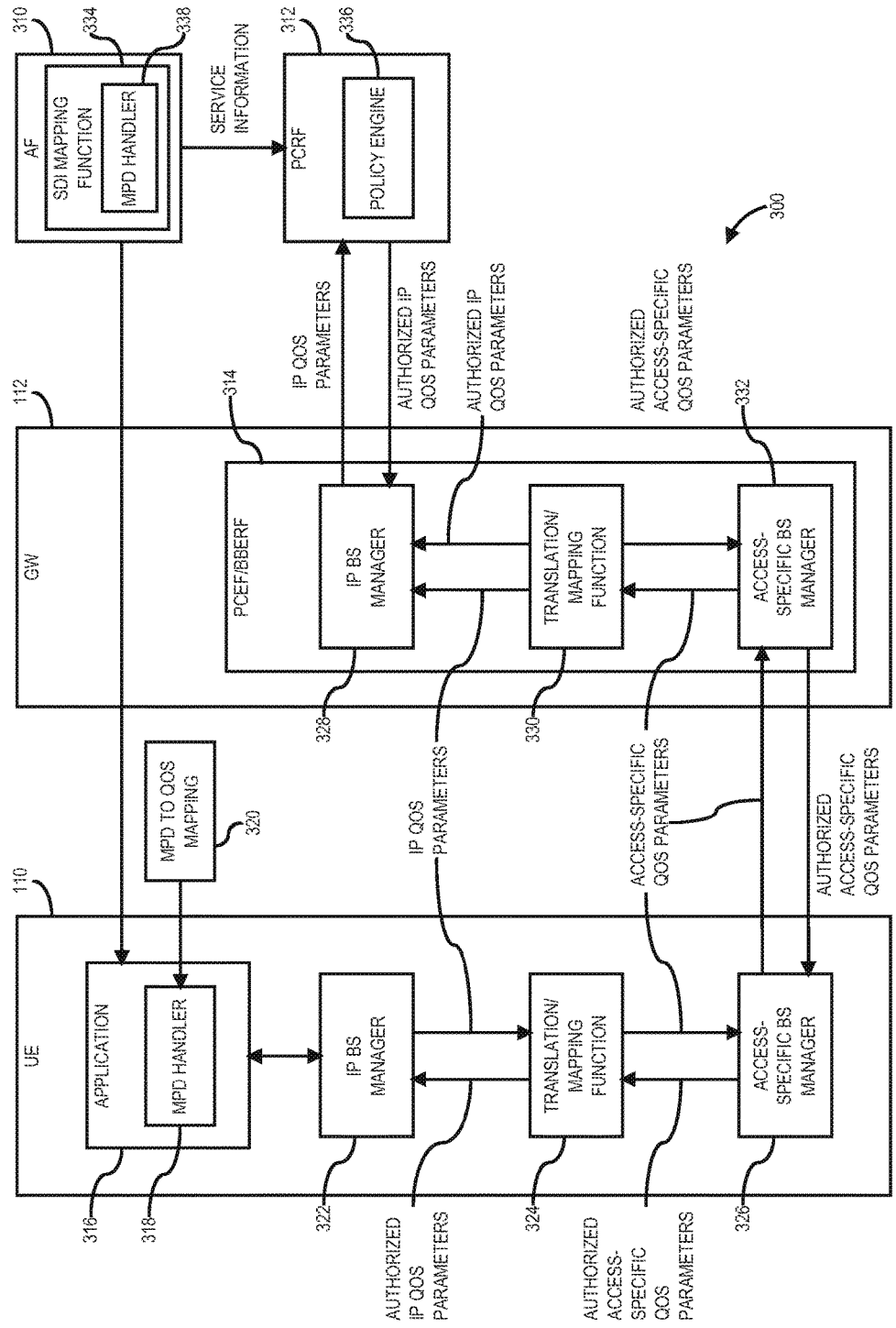
FIG. 3 is a block diagram of a policy and charging control (PCC) architecture for delivery of DASH services in accordance with one or more embodiments.

Referring now to FIG. 3, a block diagram of a policy and charging control (PCC) architecture for delivery of DASH services in accordance with one or more embodiments will be discussed. The policy and charging control (PCC) architecture 300 of FIG. 3 includes user equipment (UE) which corresponds to client 110 of FIG. 1 coupled to a gateway (GW) which corresponds to web server 112 of FIG. 1. A service-aware QoS delivery framework developed by the Third Generation Partnership Project (3GPP) is the policy and charging control (PCC) architecture 300, 265 providing operators of wireless networks such as network 100 with a standardized mechanism for QoS and charging control applicable to both Internet Protocol (IP) Multimedia Sub-systernm (IMS) and non-IMS based services. The PCC architecture 300 of FIG. 3 includes an application function (AF) 310 and a policy and charging rules function (PCRF). The application function 310 interacts with the applications that involve dynamic policy and charging control. Application function 310 extracts session information and provides this to the policy and charging rules function (PCRF) 312 over the Rx reference point. Application function 310 includes a serial digital interface (SDI) mapping function 334 that includes a media presentation description (MPD) handler 338. The function of the MPD handler 338 is substantially similar to the MPD handler 318 of the application 316 of client 110 in that it is able to parse the MPD and extract the multimedia-specific application layer parameters. In some embodiments, MPD handler 338 is provided when client 112 shares the MPD with the application function 310.

Policy and charging rules function (PCRF) 312 is the policy engine of PCC 300 and serves as the central entity for PCC-related decisions. Such decisions may be based on input from a number of different sources including operator configuration policy engine 336 in the PCRF 312 that defines the policies applied to given services, subscription information/policies for a given user received from the subscription profile repository (SPR), information about the service received from the AF 310 based on the service description information contained in the application signaling, and information from the access network 218 about what access technology is used. The PCRF 312 combines the session information received over the Rx reference point and the input received from the Gx and Gxa/Gxc reference points with user-specific policies data from the SPR to form session-level policy decisions and provides those to the policy and charging enforcement function (PCEF) and bearer-binding and event-reporting function (BBERF) of PCEF/BBERF bock 314. The PCRF 312 also forwards events between the BBERF, the PCEF and the AF 310. The PCEF 314 further may include an internet protocol bearer service (IP BS) manager 328 and an access-specific bearer service (BS) manager 332 along with a translation/mapping function 330 to provide the internetworking mechanism with the IP BS manager 328 and the access-specific BS manager 332. Likewise, client 110 includes its own IP BS manager 322, access-specific BS manager 326 with a translation/mapping function 324 providing the internetworking mechanism there between.

In one or more embodiments, the PCEF of PCEF/BBERF block 314 enforces policy decisions received from the PCRF 312 and also provides the PCRF 312 with user-specific and access-specific information over the Gx reference point. In order to integrate the DASH streaming mechanism into the QoS delivery framework enabled by the PCC architecture, the UE client 110 is provided with the capability to parse the media presentation description (MPD) and derive target QoS parameters for the core network and radio access network from the MPD. In other words, the UE/client 110 should include the following new mapping functions provided by MPS to quality of service (QoS) mapping block 320. The first mapping function comprises mapping between multimedia-specific application-layer information contained in the MPD and the set of QoS parameters for the core network, for example the DiffServ/DSCP parameters, IntServ/Flow-Specs parameters, and so on. The second mapping function comprises mapping between multimedia-specific application-layer information contained in the MPD and the set of QoS parameters for the radio access network, for example QoS class identifiers (QCI), and so on. Furthermore, the UE/client 110 should be able to signal the MPD to the network 100 in order to share DASH-related session information with the appropriate entities in the network, for example the AF 310 for the PCC architecture 300. In the case of signaling the MPD to the AF 310, further capabilities in the AF 310 may be involved in order to interpret MPD and recommend QoS policies for DASH to the PCRF.

In one or more embodiments, the set of multimedia-specific application-layer parameters in the MPD can include one or more of the following: multimedia bitrates, as included in the 'bandwidth' attribute of each DASH representation, multimedia resolution, as included in the horizontal and vertical resolution attributes of each DASH representation; multimedia encoder frame rate, as included in the 'frameRate' attribute of each DASH representation; which would also describe other codec-related parameters; buffer-related parameters, for example, minimum buffering period before initiating playout, multimedia codec information, for example, codec type such as AMR, MPEG4, H.264 AVC/SVC, and so on, possibly also describing profiles and levels, as included in the 'mimeType' attribute of each DASH representation; rate-distortion function for the multimedia stream, relevant for the 'quality Ranking' attribute of each DASH representation; other quality of experience (QoE) or multimedia quality metrics specified at different rates, reference, reduced-reference or non-reference metrics, for example, video quality metrics (VQM), structural similarity metrics (SSIM), perceptual evaluation of video quality metrics (PEVQ), video mean opinion scores (MOS), and so on, and other subjective quality metrics; number of group of picture (GOP) frames, that is GOP size and frame type, for example I-frame, P-frame, B-frame, and so on; quantization parameters for different frames, for example varying quantization scales for I, P, B frames and so on; layer type in case of scalable video coding (SVC), for example base layer, enhancement layer, and so on; application-level forward error correction (FEC), erasure coding or network coding parameters; or application-level constraints, for example delay, jitter, quality, and so on.

Figure 4:
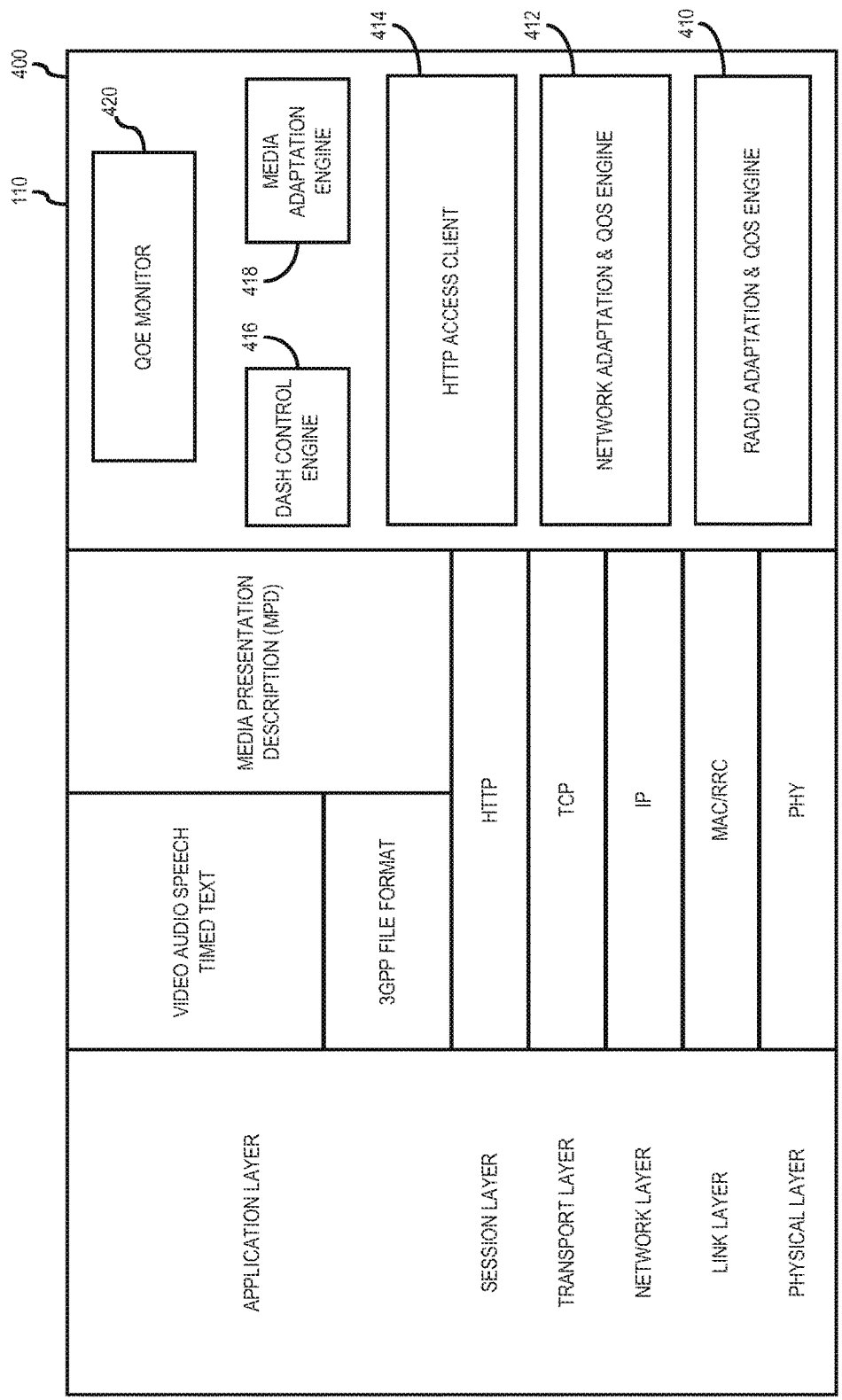
FIG. 4 is a block diagram of a DASH client adaptation architecture in accordance with one or more embodiments.
Figure 5:
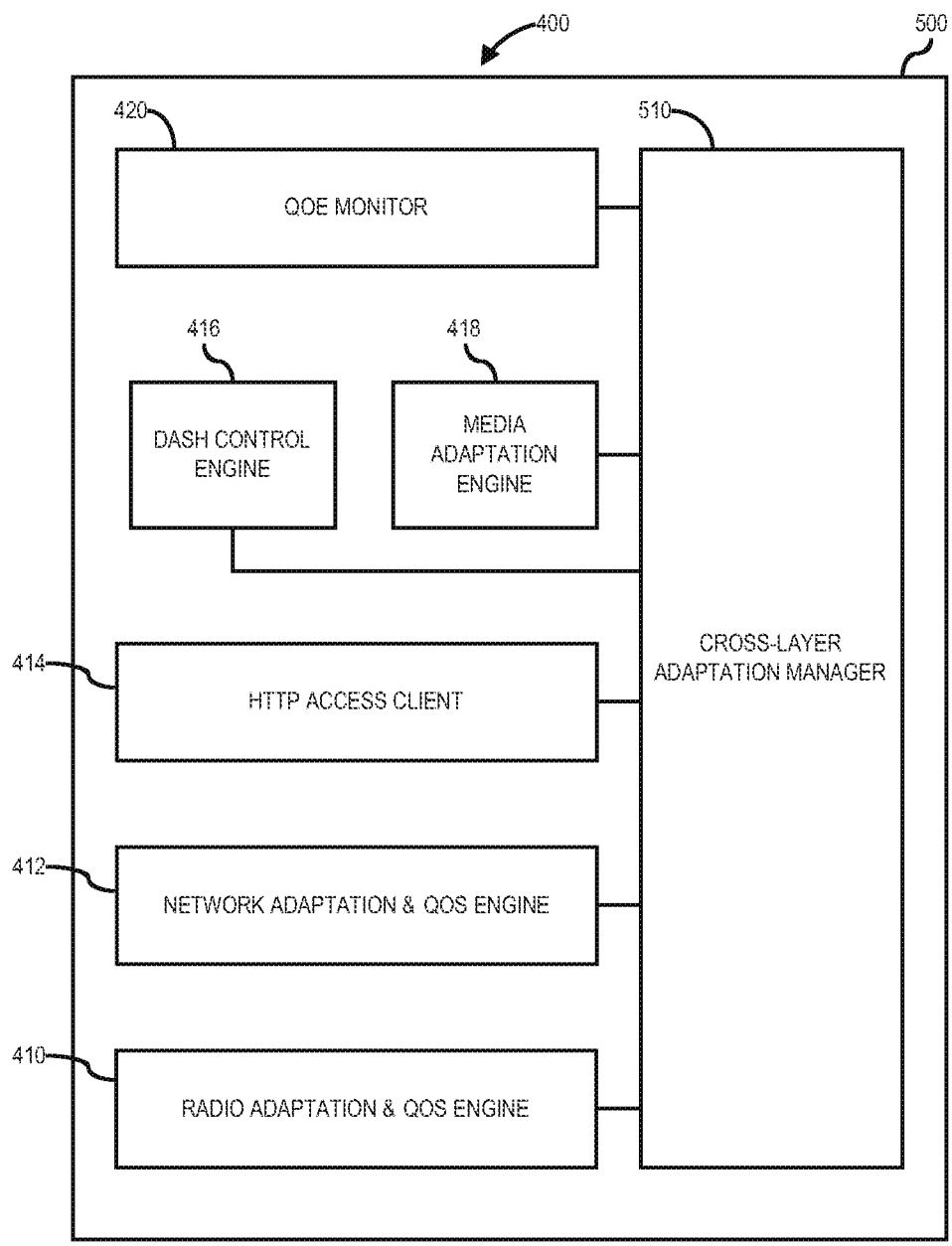
FIG. 5 is a block diagram of a cross-layer optimized DASH client adaptation architecture in accordance with one or more embodiments.

Referring now to FIG. 4, a block diagram of a DASH client adaptation architecture in accordance with one or more embodiments will be discussed. FIG. 4 shows a DASH client adaptation architecture 400 and the associated Open Systems Interconnection (OSI) communication layer information 422 for client 110. The client adaptation architecture 400 of FIG. 4 may comprise a cross-layer optimized platform adaptation architecture for DASH as shown in FIG. 5, below, in which video, transport and radio components in the platform cooperate and exchange information towards identifying in a joint manner the best platform configurations needed to optimize user quality of experience (QoE). In one or more embodiments, the DASH client adaptation architecture 400 comprises the following system blocks. A Radio Adaptation and quality of service (QoS) Engine block 410 is capable of determining radio-level adaptation and QoS parameters. A Network Adaptation and QoS Engine block 412 is capable of determining network-level adaptation and QoS parameters. A hypertext transfer protocol (HTTP) Access Client block 414 is capable of handling transport-level hypertext transport protocol/transmission control protocol/internet protocol (HTTP/TCP/IP) operation, and establishing and managing the TCP connections. A DASH Control Engine block 416 is capable of parsing the media presentation description (MPD), and determining streaming parameters for DASH, for example DASH segment duration, and sequence and timing of HTTP requests. A Media Adaptation Engine 418 is capable of determining codec-level adaptation parameters. A quality of experience (QoE) monitor 420 is capable of dynamically measuring quality of experience (QoE).

In one or more embodiments, the DASH client platform 400 may have one or several configurations that may be jointly optimized at the video, transport and/or radio levels via cross-layer cooperation wherein the configurations include the following parameters. Video level parameters may be utilized to configure video bitrate, frame rate, and/or resolution, wherein the decisions of the client 110 are capable of driving the requested content representations from the DASH server 112. Transport level parameters may be utilized to configure the sequence and timing of HTTP requests, and/or the number of parallel TCP connections, Radio and network level parameters may be utilized to configure modulation and coding scheme (MCS), and/or target QoS parameters for the core network 216 and radio access network 218. The cross-layer optimized DASH client adaptation architecture 500 is shown in and described with respect to FIG. 5, below.

Referring now to FIG. 5, a block diagram of a cross-layer optimized DASH client adaptation architecture in accordance with one or more embodiments will be discussed. The cross-layer optimized DASH client adaptation architecture 500 of FIG. 5 is capable of optimizing configuration of the DASH client adaptation architecture of FIG. 4, above. In one or more embodiments, the cross-layer optimized client DASH client adaptation architecture includes a cross-layer adaptation manager 510 that may optimize configuration of the DASH client adaptation architecture 400 by dynamically tracking the following parameters and using them as inputs for the decisions towards jointly adapting the DASH client configurations via cross-layer cooperation. Measured QoE parameters may be utilized to optimize video quality metrics (VQM), structural similarity metrics (SSIM), perceptual evaluation of video quality metrics (PEVQ), video mean opinion scores (MOS), and so on, and/or other subjective quality metrics. Furthermore, additional parameters may be optimized including measured video rate-distortion characteristics, user preferences at the application layer, multimedia-related information retrieved from the media presentation description (MPD)), information received from the network on current QoS availability and network congestion states, measured dynamic quality of service (QoS) parameters such as throughput, latency, reliability, and so on, measured dynamic channel/network conditions at the radio and transport levels, and/or power/latency budgets and central processing unit (CPU)/buffer/memory requirements at the platform architecture level. However, these are merely example parameters that may be optimized via cross-layer optimized DASH client adaptation architecture 500, and the scope of the claimed subject matter is not limited in these respects.

Figure 6:
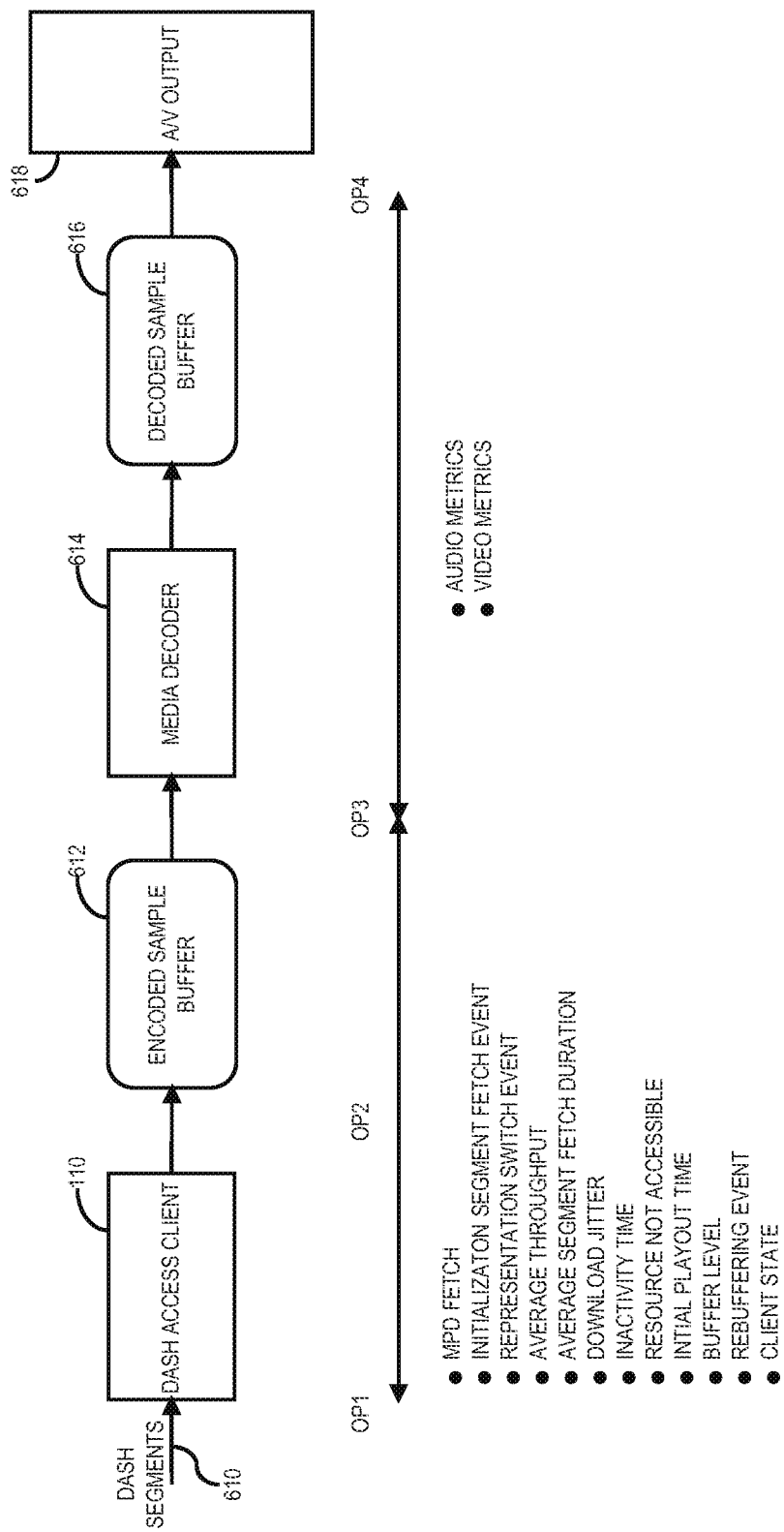
FIG. 6 is a diagram of quality of experience (QoE) metrics measured at select observation points for DASH in accordance with one or more embodiments.

Referring now to FIG. 6, a diagram of quality of experience (QoE) metrics measured at select observation points for DASH in accordance with one or more embodiments will be discussed. In one or more embodiments, the set of QoE metrics for DASH may also include the following metrics, listed below, to be measured by the DASH client 110 at four different observation points (OPs) such as OP1, OP2, OP3, and OP4 as shown in FIG. 6. It should be noted that QoE measured via different metrics in DASH compared to RTSP-based streaming, implying that the DASH client adaptation may be different with respect to RTSP-based streaming. The DASH client 110 receives DASH segments 610 which are provided to encoded sample buffer 612. The buffered segments are then decoded by media decoder 614 and fed into a decoded sample buffer 616. The decoded samples are then provided to an audio/video (A/V) output block 618 for playback of the media content received by the DASH client 110. As shown in FIG. 6, the following metrics may be measured between observation points OP1 and OP2, and between OP2 and OP3: media presentation description (MPD) fetch event, initialization segment fetch event, representation switch event, average throughput, average segment fetch duration, download jitter, inactivity time, resource not accessible, initial playout time, buffer level, rebuffering event, and/or client state. The following metrics may be measured between observation points OP3 and OP4: audio metrics and/or video metrics. However, these are merely example metrics that may be measured at the DASH client for client adaptation, and the scope of the claimed subject matter is not limited in these respects.

Figure 7:
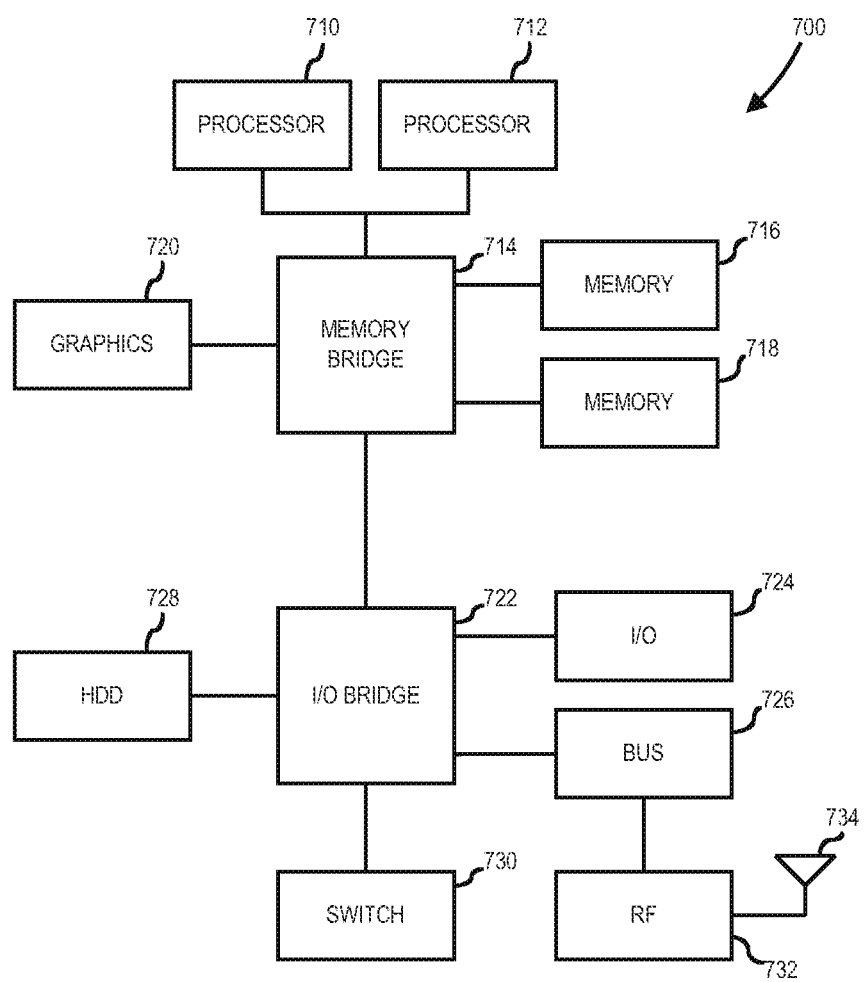
FIG. 7 is a block diagram of an information handling system capable of implementing cross-layer optimized adaptive HTTP streaming in accordance with one or more embodiments.

Referring now to FIG. 7, a block diagram of an information handling system capable of implementing cross-layer optimized adaptive hypertext transport protocol (HTTP) streaming in accordance with one or more embodiments will be discussed. Information handling system 700 of FIG. 7 may tangibly embody one or more of any of the network elements of network 100 as shown in and described with respect to FIG. 1 and FIG. 2. For example, information handling system 700 may represent the hardware of client 110, web server 112 and/or web/media server 114, with greater or fewer components depending on the hardware specifications of the particular device or network element. Although information handling system 700 represents one example of several types of computing platforms, information handling system 700 may include more or fewer elements and/or different arrangements of elements than shown in FIG. 7, and the scope of the claimed subject matter is not limited in these respects.

Information handling system 700 may comprise one or more processors such as processor 710 and/or processor 712, which may comprise one or more processing cores. One or more of processor 710 and/or processor 712 may couple to one or more memories 716 and/or 718 via memory bridge 714, which may be disposed external to processors 710 and/or 712, or alternatively at least partially disposed within one or more of processors 710 and/or 712. Memory 716 and/or memory 718 may comprise various types of semiconductor based memory, for example volatile type memory and/or non-volatile type memory. Memory bridge 714 may couple to a graphics system 720 to drive a display device (not shown) coupled to information handling system 700.

Information handling system 700 may further comprise input/output (I/O) bridge 722 to couple to various types of I/O systems. I/O system 724 may comprise, for example, a universal serial bus (USB) type system, an IEEE 1394 type system, or the like, to couple one or more peripheral devices to information handling system 700. Bus system 726 may comprise one or more bus systems such as a peripheral component interconnect (PCI) express type bus or the like, to connect one or more peripheral devices to information handling system 700. A hard disk drive (HDD) controller system 728 may couple one or more hard disk drives or the like to information handling system, for example Serial ATA type drives or the like, or alternatively a semiconductor based drive comprising flash memory, phase change, and/or chalcogenide type memory or the like. Switch 730 may be utilized to couple one or more switched devices to I/O bridge 722, for example Gigabit Ethernet type devices or the like. Furthermore, as shown in FIG. 7, information handling system 700 may include a radio-frequency (RF) transceiver 732 comprising RF circuits and devices coupled to one or more antennas 734 for wireless communication with other wireless communication devices and/or via wireless networks such as transmission system 100 of FIG. 1 of FIG. 2. Where the information handling system includes multiple antennas 734, RF receiver 732 may implement multiple-input, multiple output (MIMO) communication schemes, although the scope of the claimed subject matter is not limited in this respect. An example embodiment of an information handling system is shown in and described with respect to FIG. 8, below.

Figure 8:
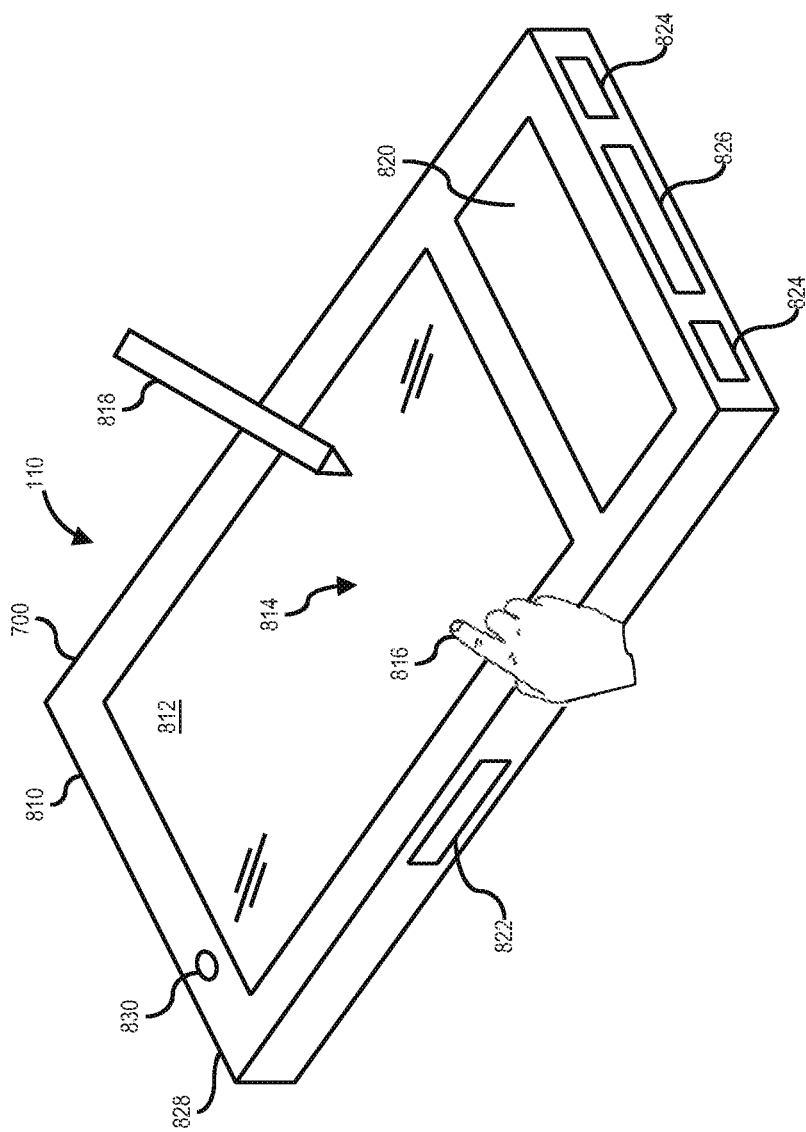
FIG. 8 is an isometric view of an information handling system of FIG. 7 capable of implementing cross-layer optimized adaptive HTTP streaming in accordance with one or more embodiments.

Referring now to FIG. 8, an isometric view of an information handling system of FIG. 7 capable of implementing cross-layer optimized adaptive HTTP streaming in accordance with one or more embodiments will be discussed. FIG. 8 shows an example implementation of information handling system 700 of FIG. 7 tangibly embodied as a cellular telephone, or smartphone, or a tablet type device or the like. In one or more embodiments, the information handling system 700 may comprise the client 110 of FIG. 1, and as such may be capable of cross-layer optimized adaptive HTTP streaming as discussed herein, although the scope of the claimed subject matter is not limited in this respect. The information handling system 700 may comprise a housing 810 having a display 812 which may include a touch screen 814 for receiving tactile input control and commands via a finger 816 of a user and/or a via stylus 818 to control one or more processors 710 or 712. The housing 810 may house one or more components of information handling system 700, for example one or more processors 710 or 712, one or more of memory 716 or 718, transceiver 732. The information handling system 820 further may optionally include a physical actuator area 820 which may comprise a keyboard or buttons for controlling information handling system via one or more buttons or switches. The information handling system 700 may also include a port or slot 822 for receiving non-volatile memory such as flash memory, for example in the form of a secure digital (SD) card or a subscriber identity module (SIM) card. Optionally, the information handling system 700 may further include one or more speakers and/or microphones 824 and a connection port for connecting the information handling system 700 to another electronic device, dock, display, battery charger, and so on. In addition, information handling system 700 may include a headphone or speaker jack 828 and one or more cameras 830 on one or more sides of the housing 810. It should be noted that the information handling system 700 of FIG. 8 may include more or fewer elements than shown, in various arrangements, and the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to cross-layer optimized adaptive HTTP streaming and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus, comprising:
a processor comprising logic circuitry which, when executed, defines:
an application function module to interact with an application on a remote device that utilizes dynamic policy and charging control to receive an adaptive multimedia stream;
a policy and charging rules function (PCRF) module coupled to the application function module, wherein the PCRF module implements policy and charging control decisions; and
a policy and charging enforcement function (PCEF) module coupled to the PCRF module, wherein the PCEF module enforces policy decisions received from the PCRF;
wherein the remote device provides session information including a media presentation description (MPD) to the application function module to provide the multimedia stream to the remote device at a specified quality of service (QoS) via application function session signaling between the remote device and the application function module, wherein the application function session signaling includes a first mapping between multimedia specific application layer information contained in the MPD and the specified QoS for a radio access network used to deliver the adaptive multimedia stream, and a second mapping between multimedia specific application layer information contained in the MPD and the specified QoS for a core network used to deliver the adaptive multimedia stream, and wherein the adaptive multimedia stream is controlled by the remote device via the MPD; and
wherein the remote device includes a cross-layer adaptation manager to optimize a quality of experience of the multimedia stream received over a network via a hypertext transport protocol.

2. An apparatus as claimed in claim 1, wherein the adaptive multimedia stream is controlled by the remote device via dynamically adaptive streaming over hypertext transport protocol (DASH).

3. An apparatus as claimed in claim 1, wherein the application function module extracts session information pertaining to the multimedia stream and provides the session information to the PCRF module.

4. An apparatus as claimed in claim 1, wherein the MPD includes the target quality of service (QoS) parameters for the adaptive multimedia stream including a guaranteed bitrate (GBR), a maximum bitrate (MBR), a target delay, or a target packet loss ratio.

5. An apparatus as claimed in claim 1, wherein the remote device obtains target quality of service (QoS) parameters from the MPD and communicates the MPD to the application function module to allow the application function module to determine the QoS parameters to be enforced over a core network or a radio access network.

6. An apparatus as claimed in claim 1, wherein the remote device determines quality of service parameters for a core network or a radio access network, or combinations thereof, and provides the quality of service parameters to the application function module.

7. An apparatus capable of receiving adaptive multimedia streaming, comprising:
a processor comprising logic circuitry which, when executed, defines:
a cross-layer adaptation manager to optimize a quality of experience of a multimedia stream received over a network via a hypertext transport protocol;
a streaming control engine coupled to the cross-layer adaptation manager, the streaming control engine being capable of parsing a media presentation description (MPD) of the multimedia stream, and to determine streaming parameters for streaming;
a media adaptation engine coupled to the cross-layer adaptation manager, the media adaptation engine being capable of determining codec-level adaptation parameters for the multimedia stream;
a quality of experience monitor coupled to the cross-layer adaptation manager, the quality of experience monitor capable of dynamically measuring quality of experience of the multimedia stream; and
a radio adaptation and quality of service engine coupled to the cross-layer adaptation manager, wherein the radio adaptation and quality of service engine is capable of determining radio-level adaptation and quality of service (QoS) of the multimedia stream at the physical layer and the link layer of the network;
wherein the cross-layer adaptation manager uses application function session signaling to provide a first mapping between multimedia specific application layer information contained in the MPD and a specified QoS for the network to deliver an adaptive multimedia stream, and a second mapping between multimedia specific application layer information contained in the MPD and the specified QoS for a core network used to deliver the adaptive multimedia stream, and wherein the adaptive multimedia stream is controlled by the remote device via the MPD.

8. An apparatus as claimed in claim 7, wherein the streaming control engine is capable of implementing a dynamic adaptive streaming over hypertext transport protocol (DASH).

9. An apparatus as claimed in claim 7, further comprising a network adaptation and quality of service engine coupled to the cross-layer adaptation manager, wherein the network adaptation and quality of service engine is capable of determining network-level adaptation and quality of service parameters at the network layer of the network.

10. An apparatus as claimed in claim 7, further comprising a hypertext transfer protocol access client coupled to the cross-layer adaptation manager, wherein the hypertext transfer protocol access client is capable of handling transport-level hypertext transport protocol/transmission control protocol/internet protocol operation, and establishing and managing transmission control protocol connections at the transport layer of the network.

11. An apparatus as claimed in claim 7, wherein the cross-layer adaptation manager is configured to optimize the media stream at the video level, the transport level, the radio level, the network level, or combinations thereof.

12. An apparatus as claimed in claim 7, wherein the cross-layer adaptation manager optimizes the media stream at the video level by configuring a bit rate parameter, a frame rate parameter, or a resolution parameter, or combinations thereof.

13. An apparatus as claimed in claim 11, wherein the cross-layer adaptation manager optimizes the media stream at the transport level by configuring a sequence and timing of hypertext transport protocol (HTTP) requests parameter, a number of parallel transmission control protocol (TCP) connections parameter, and/or a dynamic adaptive streaming over HTTP (DASH) segment duration parameter, or combinations thereof.

14. An apparatus as claimed in claim 7, wherein the cross-layer adaptation manager optimizes the media stream at radio and network levels by configuring a modulation and coding scheme parameter, a bandwidth allocation parameter, a target quality of service parameter for a core network of the network, or a target quality of service parameter for a radio access network of the network, or combinations thereof.

15. An apparatus, comprising:
a processor comprising logic circuitry which, when executed, defines:
an application function module to interact with an application on a remote device, the remote device to utilize dynamic policy and charging control (PCC) to receive an adaptive
a policy and charging rules function (PCRF) module to couple to the application function module, the PCRF module to implement policy and charging control (PCC) decisions; and
a policy and charging enforcement function (PCEF) module to couple to the PCRF module, the PCEF module to enforce policy decisions received from the PCRF;
the remote device to provide session information including a media presentation description (MPD) to the application function module to provide the multimedia stream to the remote device at a specified quality of service (QoS) via application function session signaling between the remote device and the application function module, wherein the application function session signaling includes a first mapping between multimedia specific application layer information contained in the MPD and the specified QoS for a radio access network used to deliver the adaptive multimedia stream, and a second mapping between multimedia specific application layer information contained in the MPD and the specified QoS for a core network used to deliver the adaptive multimedia stream, and wherein the adaptive multimedia stream is controlled by the remote device via the MPD; and
wherein the remote device includes a cross-layer adaptation manager to optimize a quality of experience of the multimedia stream received over a network via a hypertext transport protocol.

16. An apparatus as claimed in claim 15, the adaptive multimedia stream to be controlled by the remote device via dynamically adaptive streaming over hypertext transport protocol (DASH).

17. An apparatus as claimed in claim 15, the application function module to extract session information pertaining to the multimedia stream and to provide the session information to the PCRF module.

18. An apparatus as claimed in claim 15, wherein the specified quality of service (QoS) includes Internet Protocol (IP) QoS parameters.

19. An apparatus as claimed in claim 15, the remote device to communicate target quality of service (QoS) parameters to the application function to allow the PCRF module to determine the QoS parameters to be enforced over a connectivity access network.

20. An apparatus as claimed in claim 15, the remote device to report quality of service metrics to the application function via the MPD information provided to the application function.

21. An apparatus, comprising:
first means to interact with an application on a remote device, the remote device to utilize dynamic policy and charging control (PCC) to receive an adaptive multimedia stream;
second means to implement policy and charging control (PCC) decisions and to couple to the first means; and
third means to enforce policy decisions received from the second means;
the remote device to provide session information including a media presentation description (MPD) to the first means in order to provide the multimedia stream to the remote device at a specified quality of service (QoS) via application function session signaling between the remote device and the first means, wherein the application function session signaling includes a first mapping between multimedia specific application layer information contained in the MPD and the specified QoS for a radio access network used to deliver the adaptive multimedia stream, and a second mapping between multimedia specific application layer information contained in the MPD and the specified QoS for a core network used to deliver the adaptive multimedia stream, and wherein the adaptive multimedia stream is controlled by the remote device via the MPD;
wherein the remote device includes a cross-layer adaptation manager to optimize a quality of experience of the multimedia stream received over a network via a hypertext transport protocol.

22. An apparatus as claimed in claim 21, the adaptive multimedia stream to be controlled by the remote device via dynamically adaptive streaming over hypertext transport protocol (DASH).

23. An apparatus as claimed in claim 21, the first means to extract session information pertaining to the multimedia stream and to provide the session information to the second means.

24. An apparatus as claimed in claim 21, wherein the specified quality of service (QoS) includes Internet Protocol (IP) QoS parameters.

25. An apparatus as claimed in claim 21, the remote device to communicate target quality of service (QoS) parameters to the first means to allow the second means to determine the QoS parameters to be enforced over a connectivity access network.

26. An apparatus as claimed in claim 21, the remote device to report quality of service metrics to the first means via the MPD information provided to the first means.

* * * * *